United States Patent [19]

Acampora

[11] Patent Number: 4,691,233

[45] Date of Patent: Sep. 1, 1987

[54] RATE BUFFER CONTROL OF DIFFERENCE SIGNAL DECIMATION AND INTERPOLATION FOR ADAPTIVE DIFFERENTIAL PULSE CODE MODULATOR

[75] Inventor: Alfonse A. Acampora, Staten Island, N.Y.

[73] Assignee: RCA Corporation, Princeton, N.J.

[21] Appl. No.: 913,692

[22] Filed: Sep. 30, 1986

[51] Int. Cl.[4] .................. H04N 7/137; H04N 7/12
[52] U.S. Cl. .............................. 358/136; 358/135; 375/27
[58] Field of Search .............. 358/136, 135, 133, 138, 358/13; 375/27

[56] References Cited

U.S. PATENT DOCUMENTS

| | | | |
|---|---|---|---|
| 3,769,451 | 10/1973 | Connor | 358/135 |
| 4,460,923 | 7/1984 | Hirano et al. | 358/136 |
| 4,488,175 | 12/1984 | Netravali | 358/136 |
| 4,541,012 | 9/1985 | Tescher | 358/133 |
| 4,551,753 | 11/1985 | Nishizawa et al. | 358/140 |
| 4,562,468 | 12/1985 | Koga | 358/136 |
| 4,568,965 | 2/1986 | Powers | 358/11 |
| 4,569,058 | 2/1986 | Grallert | 358/133 |
| 4,609,941 | 9/1986 | Carr | 358/136 |

FOREIGN PATENT DOCUMENTS 59-123383 7/1984 Japan .

OTHER PUBLICATIONS

Article entitled "Picture Coding: A Review" by Netravali et al., published at pp. 366-407 of the *Proceedings of the IEEE*, vol. 68, No. 3, Mar. 1980.

*Primary Examiner*—Howard W. Britton
*Attorney, Agent, or Firm*—Joseph S. Tripoli; William H. Meise

[57] ABSTRACT

A predictive coding signal communication arrangement includes at the transmitter a subtractor for subtracting a delayed predicted signal from current signal to produce difference signals. To reduce the data throughput, the difference signals are data reduced or decimated to produce rate-reduced difference signals. The rate-reduced signals are applied to a coder for Huffman coding, run-length coding or the like, and then to a rate buffer for reducing data rate variability. The rate-reduced difference signals are also interpolated back to the original data rate and applied to an adder together with the delayed predicted signal to produce current predicted signal. The current predicted signal is at least delayed to produce the delayed predicted signal. In a particularly advantageous embodiment, the rate buffer is coupled to a fill control circuit which produces a control signal representing the rate buffer fullness. The control signal controls the decimator to adjust the decimation, and also controls the interpolator to maintain the data rate applied to the adder. Anti-alias and ghost reduction filters are also controlled by the control signal.

22 Claims, 14 Drawing Figures

RATE BUFFER CONTROL OF DIFFERENCE SIGNAL DECIMATION AND INTERPOLATION FOR ADAPTIVE DIFFERENTIAL PULSE CODE MODULATOR

This invention relates to differential pulse code modulation (DPCM) data rate reduction systems, and more particularly to the use of adaptive decimation for control of the data rate.

BACKGROUND OF THE INVENTION

The transmission of television signals in our society is widespread. The type of television transmission most familiar to the public is conventional broadcast television which occurs on VHF and UHF television channels. These television channels each have an assigned bandwidth of 6 megahertz (MHz). In some areas of the country, it would be desirable to have additional channel capacity available, as by the use of narrower channel bandwidth. While it is technologically feasible to significantly reduce the bandwidth required for conventional television broadcasting by modern coding methods, the enormous cost of changing millions of television receivers to accommodate this coding is prohibitive.

In addition to terrestrial broadcast, there are many other uses of broadcast or point-to-point transmitted television in our society. For example, international satellite television links transmit live programs around the world, television networks distribute network programming to their affiliates, and weather and earth-resource satellites transmit television signals representing their pictures. Furthermore, video teleconferencing and facsimile transmission of newspapers and printed material is receiving increasing attention. In many of these applications, it is highly desirable to reduce the required transmission bandwidth or data rate to the minimum possible, in order that a satellite or other transmission link may carry the maximum number of individual television pictures. A large body of art has arisen which is directed toward schemes for coding television signals to take advantage of the redundancy of the television signals in various manners for data rate reduction, as described for example in the article "Picture Coding: A Review" by Netravali et al., published at pages 366–406 of the proceedings of the IEEE, Volume 68, No. 3, March 1980.

According to Netravali, in addition to pulse code modulation (PCM), coding is classified in the major categories of (a) transform coding, (b) interpolate/extrapolate coding, (c) predictive coding and (d) miscellaneous coding. Pulse code modulation merely transforms the television signal into a digital signal, which in general is not a bandwidth efficient code. Transform coding breaks the television signal into blocks of data which may be considered to be subpictures, and represents the subpictures as linear combinations of certain standard sub-pictures. The proportion of each standard picture is termed a coefficient. The interpolate/extrapolate coder attempts the send certain samples to the receiver and to either interpolate or extrapolate the remainder of the samples. The miscellaneous schemes include conditional replenishment, in which individual line element sample signals from a successive field of information are compared with the corresponding line elements in the previous field, and the difference therebetween is tested against a fixed threshold. If the difference exceeds the threshold value the new value is encoded and transmitted to a receiving station, along with an appropriate address code, as described in U.S. Pat. No. 4,541,012 issued Sept. 10, 1985, to Tescher. In general, conditional replenishment techniques are not optimum because the addresses of the transmitted samples must be transmitted.

The predictive coding technique is effective for reducing the data rate. In predictive coding, the transmitter generates an error signal for transmission to the receiver which represents the difference between a current data word representing a picture element (pixel or pel) which the transmitter is receiving and a reference or "predicted" data word representing a pixel which is generated by the receiver. It should be noted that the word "pixel" is often used to denote the data word representing a pixel or the value of the data word by which a pixel is represented. The transmitter knows the value of the predicted data word or pixel in a predictive coding system, because the transmitter includes a prediction circuit which is identical to the prediction circuit in the receiver which is producing the predicted pixel. The predicted reference pixel is often a corresponding pixel from a previous frame, or a weighted linear combination of pixels lying near the corresponding pixel of either the current or the previous frame. In this context, "near" means close physical proximity in the two-dimensional picture or raster of which the pixels are a part.

FIG. 1 illustrates in block diagram form a communication system using predictive coding techniques. In FIG. 1, a transmitter 10 communicates by way of a narrow bandwidth data channel 30 with a receiver 38. Transmitter 10 includes a source 12 of frame-sequential, line-scanned analog television signals which applies the analog television signals to an analog-to-digital converter (ADC) 14. ADC 14 samples the analog signals, quantizes them (represents the infinite range of values by a finite set of values) and digitizes them (represents each value of the set by a different digital number) to form digital signals which are made available on a conductor 15. Those skilled in the art understand that digital signals may be in either serial or parallel form, and that serial digital signals may be carried on a single conductor (together with its associated ground), while parallel signals must be carried by a set (a plurality) of conductors. Since this is well known, no distinction is made hereinafter between single conductors and sets of conductors. The digital signals produced by ADC 14 on conductor 15 are applied to the noninverting (+) input terminal of a subtracting circuit or subtractor 16 which receives a predicted signal from conductor 25 at its inverting (−) input terminal. The predicted signal applied to the inverting input terminal of subtractor 16 is subtracted from the current value of the signal then being applied to the noninverting input terminal of adder 16 from conductor 15. A difference signal is generated at the output of subtractor 16. The difference signal is often known as an error signal. Since ADC 14 quantized the signal, the error signal at the output of subtractor 16 is also quantized. While not absolutely necessary to an understanding of predictive coding systems and not essential to operation of predictive coding systems, a coarse quantizer illustrated as a block 18 is often coupled to the output of subtractor 16 to coarsely quantize the difference signal into a number of "bins". The bin is itself represented by a digital number, so the output of quantizer 18 on conductor 19 is a quantized difference signal, just as is the signal on conductor 17. The term difference (or error) signal hereinafter refers to the difference (error) signal on either conductors 17 or 19, without regard to the magnitude of the quantizing steps.

The difference or error signal on conductor 19 is applied to a predictor loop designated generally as 20. Predictor loop 20 is a replica of the circuit 40 in receiver 38 which regenerates each pixel to be displayed in succession from the signal transmitted over channel 30. Predictor loop 20 includes a summer or adder 22 which receives the difference or error signal from conductor 19. Adder 22 adds to the difference or error signal the delayed value of the predicted signal to produce a new predicted signal which is made available on a conductor 23 to a predictor and delay circuit 24. Predictor and delay circuit 24 delays the new predicted signal for a predetermined length of time, and may perform other processing steps, as mentioned, such as averaging together nearby pixels. For example, the delay associated with predictor and delay circuit 24 can be one frame interval. A delay magnitude of one frame interval indicates that the intensity value of a pixel of a frame is generally expected to be the same as the value of the corresponding pixel of the preceding frame. For a still picture, this will be true for every pixel. Even in a picture having some motion, it will be true for many pixels. The new value of the predicted signal appearing on conductor 23 is a current predicted signal, which is delayed by the frame interval in predictor delay circuit 24 to become a delayed predicted signal on conductor 25. The delayed predicted signal on conductor 25 is applied to the inverting input terminal of subtractor 16 and to the input terminal of adder 22, as mentioned. As described, each pixel is characterized by a single value, which may be considered to be the luminance of a monochrome (black-and-white) picture. Those skilled in the art will realize that it may also represent the intensity of any one of a plurality of components of a color signal.

The difference or error signal on conductor 19 is also applied to a coding circuit illustrated as a coder 26. Coder 26 encodes the difference signal in known fashion, as by run length coding and/or Huffman coding. Run length coding and Huffman coding have the effect of drastically reducing the data rate, and also cause the data rate to be variable. In order to eliminate the variability of the data rate, a rate buffer 28 is coupled to coder 26 for receiving or being laden with coded difference data at a variable rate, for temporarily storing the coded difference data, and for applying the coded difference data at a constant rate through channel 30 to receiver 38. This type of buffer is often known as a first-in, first-out (FIFO) memory.

Receiver 38 receives coded difference data at a constant rate from channel 30, and stores the coded difference data in a rate buffer 48. Data is supplied therefrom as required to a decoder 46, which accepts the run length and Huffman-coded difference data at a variable rate, and decodes it into difference or error signals available on conductor 59, exactly corresponding to the signals which were available on conductor 19 of transmitter 10 (except for transmission errors, which are not considered herein). The decoded difference or error signals are applied to an input terminal of a summer or adder 42 of a predictor loop designated generally as 40. Adder 42 adds together the difference or error signal appearing on conductor 59 and the delayed predicted signal appearing on conductor 45, to produce a new predicted signal on a conductor 43, which is applied to a digital-to-analog converter (DAC) 54 for generating an analog signal, which is applied to a television display circuit illustrated as a block 52 for display of the picture. The new predicted signal is also applied from conductor 43 to a predictor and delay circuit 44 which is identical to predictor and delay circuit 24 of transmitter 10. Since predictor and delay circuit 44 is identical to predictor and delay circuit 24, the new predicted signal on conductor 43 appears on conductor 45 after a corresponding delay, which in the example is one frame interval. The resulting delayed predicted signal on conductor 45 is applied to adder 42, as mentioned.

The signal on conductor 19 of transmitter 10 and the signal on conductor 59 of receiver 38 are identical (except for a time lag due to the time required for transmission therebetween), because decoder 46 performs a transformation which is the precise inverse of that performed by coder 26. Difference signals applied by conductor 19 to adder 22 are therefore identical to the signals applied from conductor 59 to adder 42, and since predictor 20 is identical to predictor 40, the new predicted signals produced on conductors 23 and 43 are identical, except for the transmission time lag (which has no significant effect, and is hereinafter ignored). Since predictor and delay circuits 24 and 44 are identical, and each receives the new predicted signal at its input, each produces identical delayed predicted signals on its output conductor (25 and 45). Thus, transmitter 10 produces on conductor 23 a signal identical to that which receiver 38 currently produces for display. For this purpose, the term "currently" does not refer to concurrence in time, but rather to concurrence of television frame number and raster position. Consequently, transmitter 10 always has available to it at the inverting input of subtractor 16 a delayed predicted signal identical to that generated by receiver 38 for the corresponding pixel of the previous frame. Therefore, the error signal being transmitted at any moment from transmitter 10 is the difference between the television signal then being applied on conductor 15 to subtractor 16, from which is subtracted a signal corresponding to that produced and displayed by receiver 38 for the previous frame. It should be noted that during system design experimentation relating to predictor and quantizer effects, a receiver 38 may not be used; the signal on conductor 23 of the transmitter is considered to be a replica of the signal produced on conductor 43 by such a receiver.

Predictive systems such as that illustrated in FIG. 1 can achieve very large reductions in data rate, especially on still pictures. However, when the picture has motion, the predicted signal may at times be most unlike the actual current value. When there is substantial motion in the television picture, the difference or error signals on conductor 19 tend to be large in value and to change rapidly. Consequently, run length coding tends to be relatively less effective in reducing data rate, and Huffman coding tends to produce relatively longer code words. Since the data rate of channel 30 is pre-established and rate buffer 28 of transmitter 10 can only transmit data at the maximum rate allowed by channel 30, it is possible for rate buffer 28 to become overfull or to "overflow" when the average size of the code word length is large, and code words are applied to the rate buffer for a long period of time at a high rate. The term "overfull" and "overflow," while descriptive, may not be sufficiently accurate. The rate buffer is "laden" or loaded by the difference between the variable flow of code words into the buffer and the fixed flow of code words out of the buffer, which forms a "lading" or loading which varies with time. The capacity of the buffer is the maximum lading which it can hold. The lading may from moment to moment vary from zero (empty buffer) to the maximum capacity of the buffer (corresponding to a full buffer). Any attempt to increase the lading, even by one bit, creates an "overflow" condition. "Underflow" occurs when the buffer writes or attempts to write to the outside world a number of bits which exceeds the number of bits in the lading, with the result that meaningless zero values are transmitted as meaningful data. When the lading is such that underflow or overflow occurs, some code words may not be stored in rate buffer 28, or are corrupted, and are therefore lost. The loss or corruption of code words is very serious in a predictive encoding type of communication system, and leads to substantial errors in data transmission and consequent distortions of the transmitted picture.

It should be noted that the quantizer (18) in these loops is recognized as being a nonlinear element, which makes rigorous analysis difficult. Furthermore, the quantizer may have quantizing steps of different sizes, which increases the nonlinearity. However, ignoring the nonlinearity in the analysis produces results which, while not rigorous, indicate trends, and which can therefore be useful.

A known method for stabilizing the lading of the rate buffer (and therefore preventing exceeding the capacity of the buffer by underflow or overflow) is to sense the amount of lading of the rate buffer, and to generate a control signal which is applied to at least one of the elements of the predictive coding system which produces the coded difference signal to reduce the rate of generation of the code words when the control signal indicates that the buffer is above or below a certain lading level.

FIG. 2 illustrates a predictive encoding system similar to FIG. 1. The arrangement of FIG. 2 differs from the arrangement of FIG. 1 in that a fill control circuit illustrated as a block 210 is coupled to rate buffer 28 in transmitter 110 for producing a control signal on a conductor 212 representing the level of fill or lading level of rate buffer 58. The control signal on conductor 212 is applied to a decimator illustrated as a block 214, which is connected by conductors 15 and 15' between ADC 14 and the noninverting input terminal of subtractor 16. Decimator 214 is intended to reduce the data rate by decimating pixels, lines or frames. In this context, decimation means deletion of a proportion of the total number of pixels, lines or frames. For purposes of explanation, the description hereinafter assumes that pixels are being decimated. As a more specific example, decimator 214 could eliminate the data word corresponding to every other pixel, which would therefore reduce the true data rate by a factor of 2. This is a drastic reduction in data rate, and other reductions might be preferable, as for example elimination of one out of three (3:2) or one out of four (4:3) pixels. Decimators may be implemented as switches which alternately pass and block the pixels applied thereto, or they may include a sample-and-hold function operated at a clock rate lower than the clock rate of the applied signals, or the like. However implemented, decimator 214 when it is in the decimation mode reduces the true data rate being applied over conductor 15 to the noninverting input terminal of subtractor 16.

Since the purpose of the decimating scheme is to reduce the number of difference words applied to buffer 28 by reducing the number of words applied to coder 26, coder 26 must have at least its input clock rate adjusted in response to the selected operating mode of decimator 214, if appropriate. Since the output clocking of coder 26 is asynchronous, this clocking need not be changed in response to the operating mode of the decimator.

Decimator 214 has an effect generally similar to that of a filter. When in a decimation mode, decimator 214 tends to reduce the amount of high frequency data coupled through the system. To the extent that introduction of the decimator does not change the operation or timing of those elements of transmitter 110 which are downstream from the decimator, it also has no effect on receiver 238 other than affecting the high frequency content of the reproduced picture. Since alternate pixels are being deleted in the aforementioned specific example, receiver 238 must accommodate the reduced data rate as by sample-and-holding each pixel for an additional clock period, or by interpolating each missing pixel from its neighbors in an expander. This sample-and-hold or interpolation function is performed by an interpolator or expander. The expander is illustrated in receiver 238 as a block 264. There are, however, some problems with the arrangement of FIG. 2.

Some of the problems associated with the arrangement of FIG. 2 are explained with reference to FIG. 3, which is a skeletonized or simplified version of FIG. 2. Elements of FIG. 3 corresponding to those of FIG. 2 are designated by the same reference numerals. Decimator 214 may take any of several forms. Some of the problems are less severe with 2:1 decimation, but as mentioned other decimation ratios may be more advantageous. A simple 2:1 decimator could be implemented by a simple switch, which passes alternate pixels and, for those pixels which are not passed, provides a reference value such as zero on conductor 15'. The first problem which arises when the decimator is switched from a nondecimating mode into the decimating mode is that every other pixel arriving at adder 16 from conductor 15' has zero value, whereas for at least one frame interval following the switchover, each pixel arriving at adder 16 from conductor 25 has a finite value. Consequently, for each correct difference signal generated on conductor 17, at the next clock cycle there follows a difference signal which is the inverse of the corresponding pixel from the previous frame. This inverse pixel occurs because subtractor 16 subtracts the predicted signal (the subtrahend) on conductor 25 (where every pixel has a finite value) from the zero value of the decimated pixel arriving from conductor 15' (the minuend), by inverting the polarity of the predicted signal on conductor 25 and adding it to the zero value on conductor 16, thereby producing a full value (not a difference) corresponding to the magnitude of the pixel of the previous frame, but of opposite polarity. It is clear that these full-value, inverted signals should not be transmitted through channel 30 to receiver 338, because they will result in large codewords, which is contrary to the desired end of reducing the data rate. On the other hand, these full-value, inverted pixels are circulating in predictor loop 20, and if they are somehow prevented from reaching receiver 338, predictor loop 40 will circulate values which do not correspond with those circulating in loop 20. As a result, the reproduced picture will undesirably diverge from the picture being transmitted.

As mentioned above, 2:1 decimation is extreme, and lesser values will generally be desired. Decimators for values other than 2:1 are known in the prior art. Such a decimator (termed a sample rate converter) is described, for example, in U.S. Pat. No. 4,568,965 issued Feb. 4, 1986, in the name of Powers. Such decimators or sample rate converters do not simply delete occasional pixels, but rather produce new sets of pixels with a new clock timing, so that signal is always available on each clock cycle. Thus, rather than calling such a sample rate converter a decimator, it might better be termed a data density "reducer" which reduces the sample density. For simplicity, assume that reducer 214 of FIG. 3 is a 4:3 reducer, which, for each four pixels received over conductor 15, produces on conductor 15′ three new pixels, the values of which are related to the values of the four incoming pixels. Therefore, the input section of reducer 214 has a higher data rate than does the output section of the reducer. In this example the data density or rate at the reducer input is 4/3 higher than at its output. At the moment at which decimator or reducer 214 is switched from a nonreducing to a reducing mode (or from one reducing mode to a further reducing mode), the clocking of the signals arriving at adder 16 from conductors 15′ and 25 becomes disparate. That is to say, that predictor loop 20 is clocked at a higher rate than reducer 214, and is producing more samples during each unit time for application over conductor 25 to the inverting input of subtractor 16 than reducer 214 is producing for application to the noninverting input of subtractor 16. More specifically, in the case of 4:3 reduction, each clock cycle of the signal arriving at adder 16 from conductor 15′ has a duration of $1\frac{1}{3}$ times the duration of each clock cycle arriving from conductor 25. It is not clear how this can be handled in subtractor 16. The mathematics of summation would certainly be complex.

FIG. 4 illustrates a possible scheme which might be considered for eliminating the problem of different data densities at subtractor 16 in the arrangement of FIG. 3. The arrangement of FIG. 4 is similar to the arrangement of FIG. 3, and elements of FIG. 4 corresponding to those of FIG. 3 are designated by the same reference numerals. FIG. 4 differs from FIG. 3 in that a second decimator or data density reducer designated 314 identical to reducer 214, is coupled between the output of predictor and delay circuit 24 and the inverting input of subtractor 16. Reducer 314, being identical to reducer 214, causes the data rate or data density on conductor 25′ to equal that on conductor 15′, so that subtractor 16 can operate in a simple and straightforward fashion to produce difference signals on conductors 17 and 19 at the lower data density. However, this simply transfers the data density problem to adder 22. This can be readily understood by noting that the error signals applied to adder 22 from conductor 19 are at a relatively lower data density, but the predicted signal produced by predictor and delay circuit 24 and applied by conductor 25 to the other input of adder 22 is at the higher data density. Furthermore, it is not clear what must be done at the receiver to compensate for the effect of reducer 314, taking into account that the predictor loops in the transmitter and receiver must be identical.

FIG. 5 is similar to FIG. 4, but with data density reducer 314 replaced by a reducer 514 connected in a slightly different position, and with a further matching reducer 564 added to receiver 538. Otherwise, FIG. 5 is identical to FIG. 4. Reducer 514 is coupled between the output of predictor and delay circuit 24 and conductor 25, and is placed in operation simultaneously with reducer 214. With the illustrated location of reducer 514, when reducers 214 and 514 are operating in a data or pixel reducing mode, the reduced data density appears on conductor 25, so that subtractor 16 operates with reduced data density at both inputs, and adder 22 likewise operates with equal data densities at both inputs. Similarly, adder 42 of receiver 538 operates with reduced data at both its inputs. However, new problems have arisen. In FIG. 5, one problem is represented by the numerals 3 and 4 associated with the input and output ends of reducer 514 and of predictor and delay circuit 24. The numerals 3 represent the lower clock rate associated with the output signal of reducer 514 and the input signal of predictor and delay circuit 24, while the numerals 4 represent the higher clock rate associated with the output signal from predictor and delay circuit 24 and the input of reducer 514. In some way, predictor and delay circuit 24 must accept three data samples per unit time, and produce or output four data samples in that unit time. This is not a simple matter, especially when considering that more than one mode of operation is required. The first mode of operation corresponds to the mode when no data reduction is necessary, and a second mode is the reducing mode. Furthermore, it may be desirable to have further values of data reduction other than 4:3, as for example 8:7, and there must therefore be provision for many operating modes. The same problem also arises at the receiver. Remember that receiver prediction loop 40 must be identical to transmitter prediction loop 20. Since loop 20 includes a reducer 514 connected to the output terminal of predictor and delay circuit 24, loop 40 also includes a reducer illustrated as 564 connected to the output of prediction and delay circuit 44. Some way must also be found to cope with the fact that before decimation begins, predictor and delay circuit 24 of transmitter 510 contains a full frame of full density data, but during reduced data operation it contains less information; it would appear that to prevent artifacts an entire frame of stored data must be reduced instantly at the moment of switchover. Correspondingly, when switching out of the data reduction mode, the data then stored in predictor and delay circuit 24 must instantaneously be augmented. This problem also occurs at the receivers, in that at the moment of changing modes, the data stored in predictor and delay circuit 44 must be instantaneously increased or decreased.

U.S. Pat. No. 4,488,175 issued Dec. 11, 1984, to Netravali describes a predictive coding communication system in which a 2:1 decimator (213) follows the predictive loop in the transmitter and acts on the difference signal flowing to the coder. In this arrangement, the difference signal produced at the output of the subtracting circuit (207) in the transmitter has full data density at all times. However, the corresponding predictor in the receiver receives as an input signal difference signals having 2:1 density reduction. Thus, the predictor loops in the transmitter and the receiver are fundamentally different. In order to cause the predictor loop in Netravali's transmitter to produce substantially correct predicted signals (signals corresponding to those produced by the receiver), the path to the input to the predictor and delay circuit of the transmitter (201) from the transmitter adder (209) includes a switched circuit (including elements 210, 211, 212 and 250) which produces samples which during alternate clock cycles are simply the output pixel of the adder, and which during the next clock cycle are the average of two adjacent pixels. The Netravali arrangement has no data density problems associated with the predictor loop, because its reducer or decimator is coupled between the predictor loop and the coder. The Netravali system does not seem to be amenable to data reductions other than 2:1, and has the problem of lack of identity of the transmitter and receiver prediction loops.

SUMMARY OF THE INVENTION

A method and apparatus for differential pulse code modulation includes the step of subtracting delayed predicted signals from incoming television signals to produce difference signals. The difference signals are reduced or decimated to produce decimated difference signals. The decimated difference signals are made available for coding to produce coded decimated difference signals which may be transmitted to a receiver. The decimated difference signals are also interpolated to produce an interpolated sample for each decimated sample to form data rate reduced difference signals. In one embodiment, the data rate reduced difference signals include a stream of intermixed decimated difference signals and interpolated signals. The delayed predicted signals are added to the data rate reduced difference signals to produce current predicted signals. The current predicted signals are delayed to produce the delayed predicted signals. In a particularly advantageous embodiment of the invention, the coded decimated difference signals are stored in a rate buffer as they are generated to form buffered coded signals which tend to load the rate buffer. The lading of the rate buffer may completely fill the buffer to its maximum capacity and then try to overfill the buffer, thereby creating an overflow condition, which may undesirably create errors in the transmission to the receiver. The amount or degree of lading is monitored, and a control signal is generated for controlling the amount of decimation of the difference signals in response to the control signal to thereby control the rate at which the rate buffer is filled and thereby tend to maintain it partially full.

DETAILED DESCRIPTION OF THE INVENTION

Figure 1:
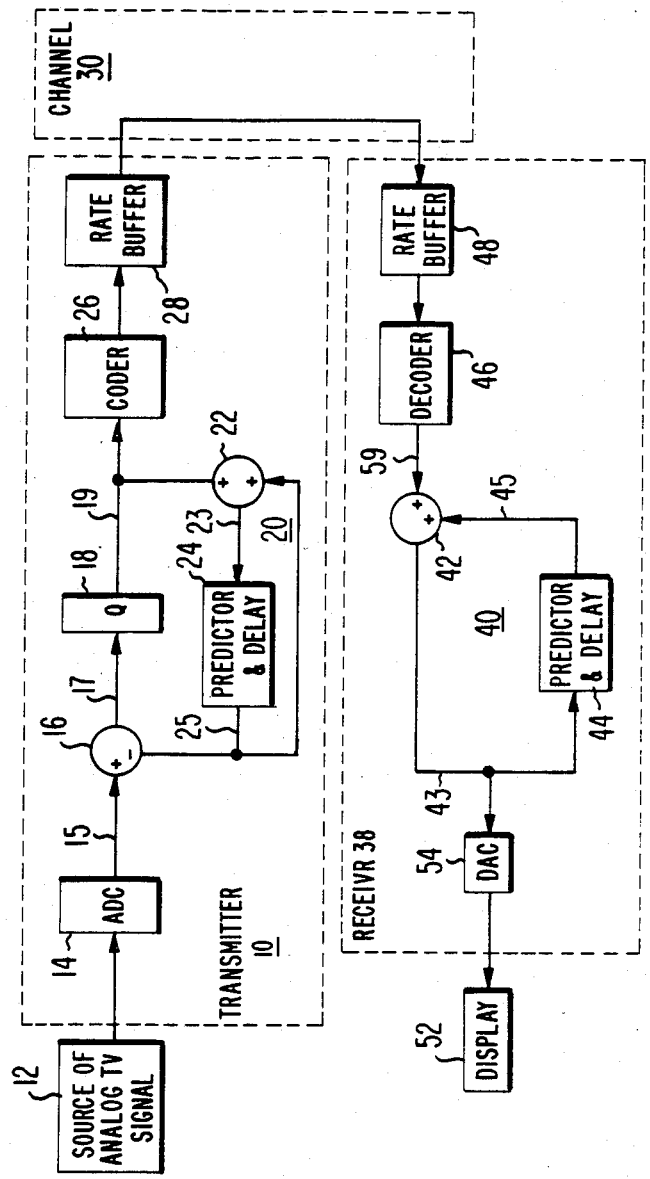
FIG. 1 is a block diagram of a data communication system using the prior art predictive coding system.
Figure 2:
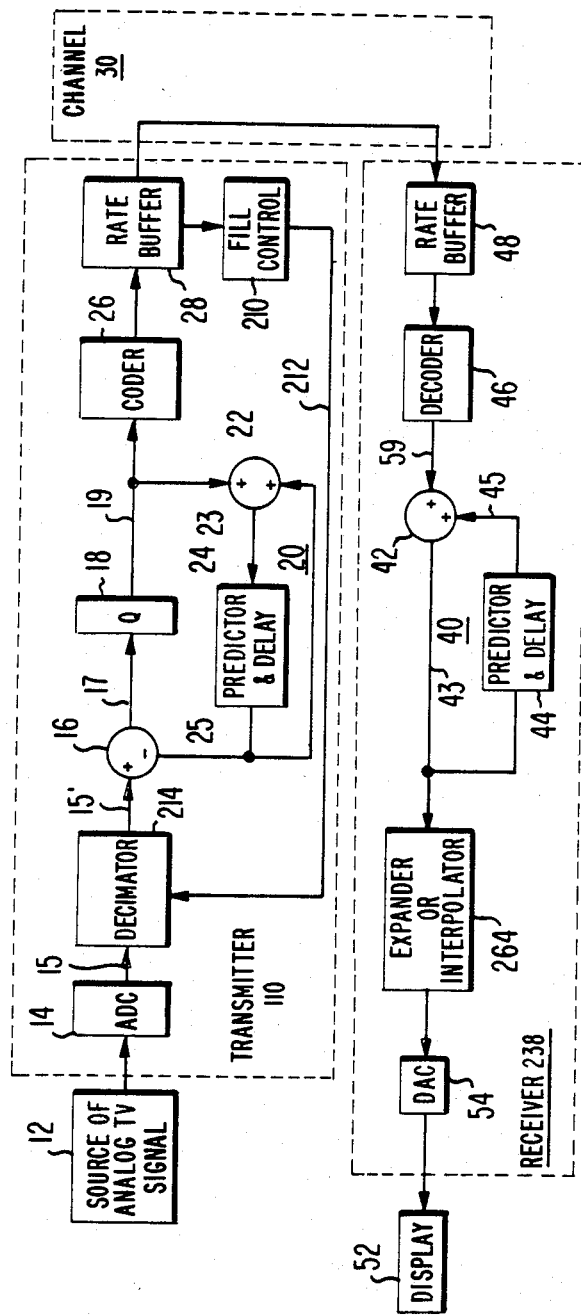
FIG. 2 is a block diagram of a communication system similar to that of FIG. 1, further including a decimator arranged to decimate the applied television signals, and also including a fill control for controlling the decimator in response to the lading of the rate buffer.
Figure 3:
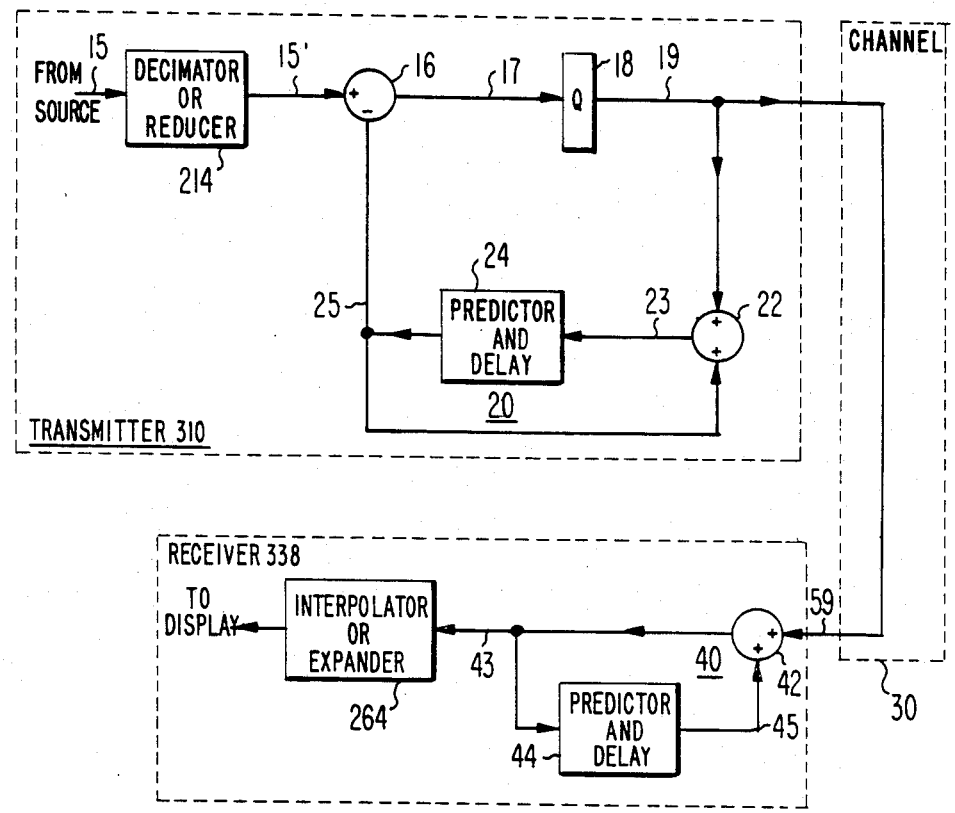
FIG. 3 is a simplified block diagram of the arrangement of FIG. 2.
Figure 4:
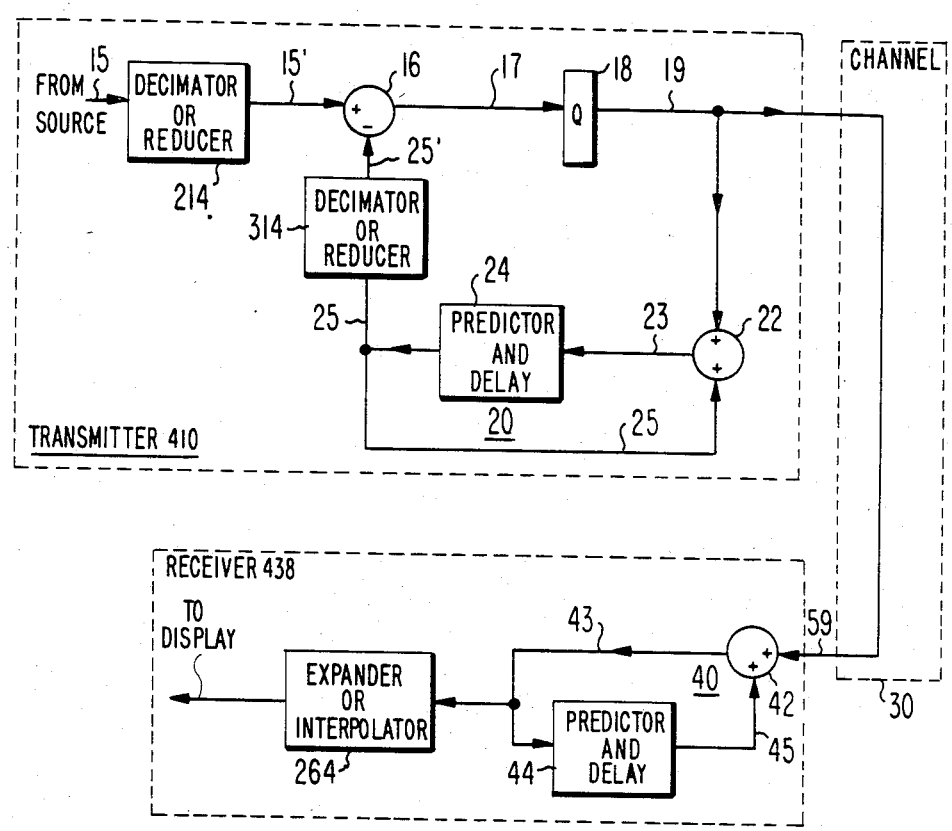
FIGS. 4 and 5 are diagrams similar to FIG. 3, further including a second decimator or reducer, for aiding in understanding certain problems associated with data rate reductions.
Figure 5:
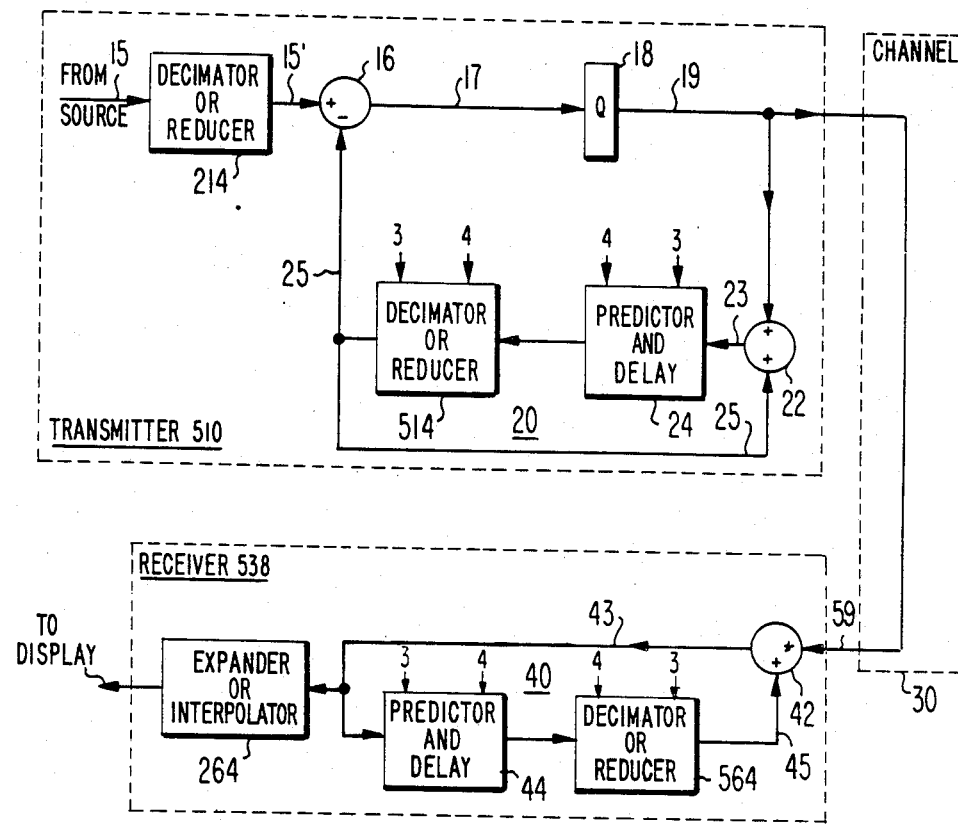
Figure 6:
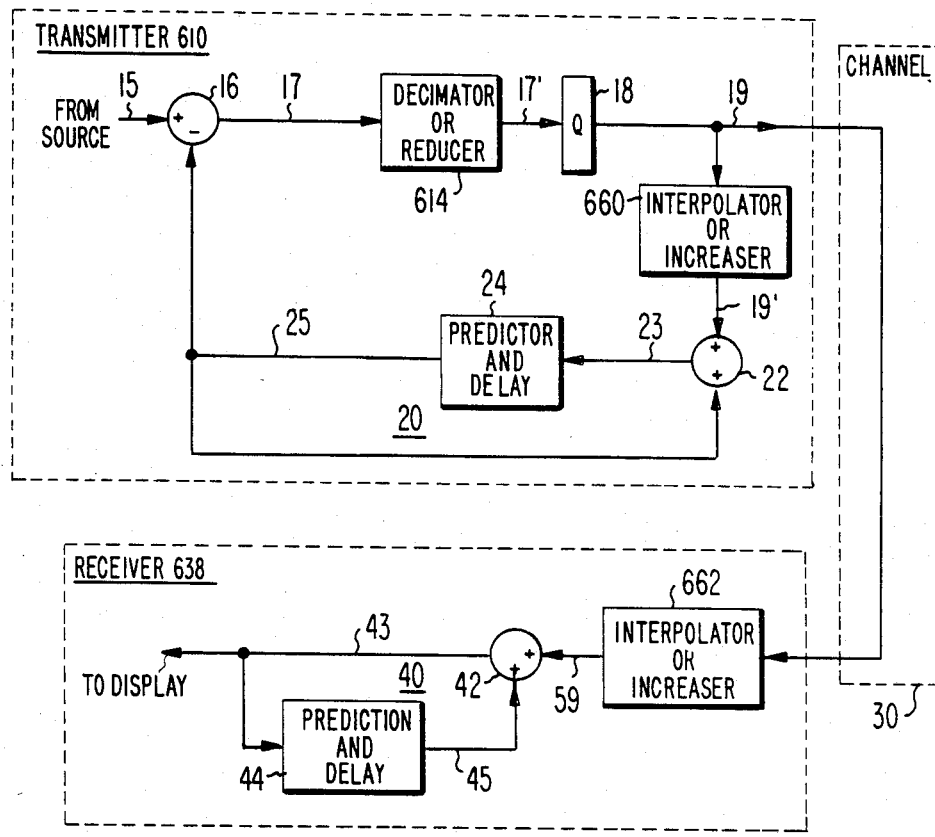
FIG. 6 is a simplified block diagram of a predictive communication system according to an embodiment of the invention.

FIG. 6 is a simplified block diagram of a predictive coding system according to an embodiment of the invention. FIG. 6 is generally similar to FIG. 3, and elements of FIG. 6 corresponding to those of FIG. 3 are designated by the same reference numerals. The arrangement of FIG. 6 further includes a decimator or reducer designated 614 connected by conductors 17 and 17' between the output of subtractor 16 and the input of coarse quantizer 18. As mentioned, quantizer 18 is illustrated only because it is conventionally used in conjunction with predictive coding systems, but it is not necessary for the operation of the invention. In effect, decimator or reducer 614 is connected between the output of subtractor 16 and conductor 19. Decimator or reducer 614 produces data reduced error signals on conductor 19 for application by way of channel 30 to a receiver 638. FIG. 6 also includes an interpolator or data rate increaser 660 coupled by a conductor 19' between conductor 19 and an input terminal of adder 22. Interpolator or data increaser 660 is controlled in conjunction with decimator or reducer 614 to be energized simultaneously therewith and to perform an inverse function. Thus, interpolator or increaser 660 produces two nonzero pixels for each pixel having nonzero value applied thereto during those times when decimator or reducer 614 reduces the data by 2:1. In the simple case of 2:1 data reduction by decimator 614, interpolator 660 might pass the undecimated difference pixels, and interpolate between the undecimated difference pixels to produce average or interpolated pixels therebetween, thereby generating an intermixture of alternating unaffected and interpolated pixels for application to adder 22. Such a simple interpolator is shown as elements 210, 211, 212 and 250 in FIG. 2 of the aforementioned Netravali patent. Alternatively, interpolator 660 might produce four pixels for every three pixels applied thereto when decimator or reducer 614 reduces the number of pixels by the factor 4:3. Such interpolators or increasers are known in the art. An arrangement similar to the aforementioned Powers arrangement acts as an interpolator when converting from a smaller sample rate to a higher sample rate. Thus, transmitter 610 of FIG. 6 receives full density data on conductor 15 for application to the noninverting input terminal of subtractor 16. The difference or error signal produced on conductor 17 is data rate or density reduced, and the density reduced signal is applied to channel 30 to receiver 638. The density reduced signal is also applied to interpolator or data increaser 660 which restores the density and applies the restored density difference signal over conductor 19' to an input of adder 22. Adder 22 also receives full density delayed predicted signals over conductor 25 from the output of predictor and delay circuit 24, and produces full density current predicted signals on conductor 23 for application to predictor and delay circuit 24. The full density delayed predicted signals on conductor 25 are also applied to the inverting input terminal of subtractor 16, to be subtracted from the applied signal to produce the difference signals. Subtractor 16, adder 22 and predictor and delay circuit 24 of transmitter 610 all operate at a full clock or data rate, which remains constant for all operating conditions. Nevertheless, decimated or reduced density error signals are made available on conductor 19, as described.

Receiver 638 of FIG. 6 receives reduced density error signals from channel 30. In order to regenerate the signals in receiver 638 in exactly the fashion in which the predicted signals are generated in transmitter 610, a further interpolator or data rate or density increaser 662 receives the data reduced error signals from channel 30 for increasing the density in a manner identical to that by which interpolator or increaser 660 increases the density. Thus, the interpolated or density increased difference signals on conductor 59 of receiver 638 are identical to those produced on conductor 19' of transmitter 610. Since the remainder of prediction loop 40 of receiver 638 is identical to prediction loop 20 of transmitter 610, loop 40 produces predicted signals on conductor 43 which are made available for display. The predicted signals on conductor 43 of receiver 638 are identical to the predicted signals produced on conductor 25 by transmitter 610.

It should be noted that while quantizer 18 is not necessary for operation of the invention, if it is to be used, it must take a position following density reducer 614, as illustrated in FIG. 6 for any data density reduction which is other than a simple dropping of pixels. That is to say, quantizer 18 may precede density reducer 614 if reducer 614 performs only dropping of one out of N pixels, but must follow reducer 614 as shown for such density reductions as 4:3. This is because quantizer 18 reduces data by forcing all difference values into one of a small plurality of "bins", as mentioned. This function is not affected by simple deletion of some of the coarsely quantized pixels formed thereby. However, if the coarsely quantized pixels produced by quantizer 18 are density reduced by a process in which new pixels are generated which have values derived from two or more coarsely quantized pixels, the new pixels so formed may, and in general will, have values which are not among the "bin" values. This defeats the purpose of the coarse quantizer. Additionally, the coder may be presented with pixel values which are not in the ensemble of allowed coder inputs, and therefore the signals may not be coded, or may be incorrectly coded. Simple dropping of pixels, other than in a simple 2:1 manner, produces an undesirable pattern in the reproduced picture. This is one reason that the simple 2:1 decimator in the aforementioned Netravali patent, which follows the coarse quantizer, is not amenable to reductions other than 2:1.

Figure 7:
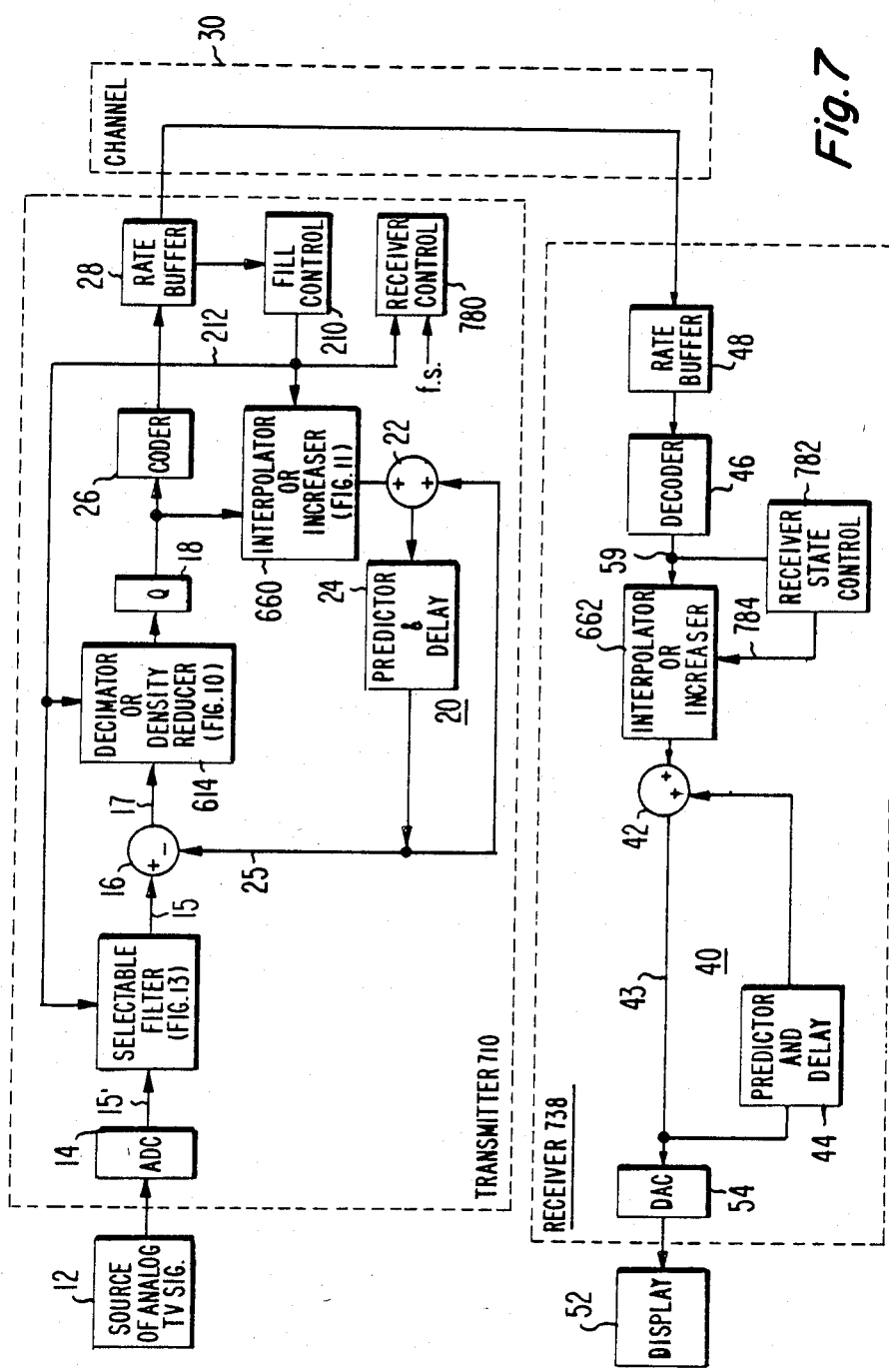
FIG. 7 is a more complete block diagram of a predictive communication system.

FIG. 7 is a block diagram of an embodiment of the invention. The elements of FIG. 7 corresponding to elements of FIGS. 1 through 6 are designated by the same reference numbers. The arrangement of FIG. 7 is generally similar to that of FIG. 6, but differs in that a selectable low-pass filter 712 has been connected between ADC 14 and the noninverting input terminal of subtractor 16. Also, explicit connections between fill control 210 and decimator 614, interpolator 16 and filter 712 are illustrated by a conductor 212. These connections represent the simultaneous control of the decimator, interpolator and filter. Thus, in a nondecimated mode, selectable decimator or reducer 614 does not decimate, interpolator or increaser 660 does not increase the density or data rate, and selectable filter 712 has maximum bandpass in order to provide the highest resolution picture. When fill control 210 produces a control signal on conductor 212 indicating that some decimation is required, decimator or reducer 614 is set to a particular amount of data reduction. Interpolator or increaser 660 is correspondingly set to an exactly inverse density increase. As mentioned, this decimator or density reduction reduces the effective data rate. This results in an effective reduction in the rate at which the incoming pixels are sampled, which as known may result in aliasing if the information rate is too high. In order to reduce aliasing, selectable filter 712 is switched into a band limiting mode to reduce the effective resolution of the image which is represented by the signal applied to the noninverting input of subtractor 16 in order to reduce aliasing. No corresponding filter is necessary in the receiver.

Not discussed so far is the fact that interpolator 662 of the receiver must be switched into operation concurrently with the switching of decimator 614 of the transmitter (i.e. at the time of which the decimated frame is issued by decoder 46). In order to reduce the overhead required to be transmitted over the data channel for control of the state of interpolator 662, the control signal which commands the switching is transmitted a maximum of once each frame interval, depending upon the state of the fill control signal from fill control block 210. This function is performed in the arrangement of FIG. 7 by a block 780, which responds to the fill control signal and to other signals such as frame synchronizing (f.s.) signals to produce command words which are coupled by paths (not illustrated) to coder 26 where they are coded, and from which they pass by rate buffer 28 and channel 30 to receiver 738. At receiver 738, a state control circuit illustrated as a block 782 receives the command word or words and controls the status of interpolator or density increaser 662. Such control functions are well within the skill of those in the art, and further discussion is deemed to be unnecessary.

Figure 8:
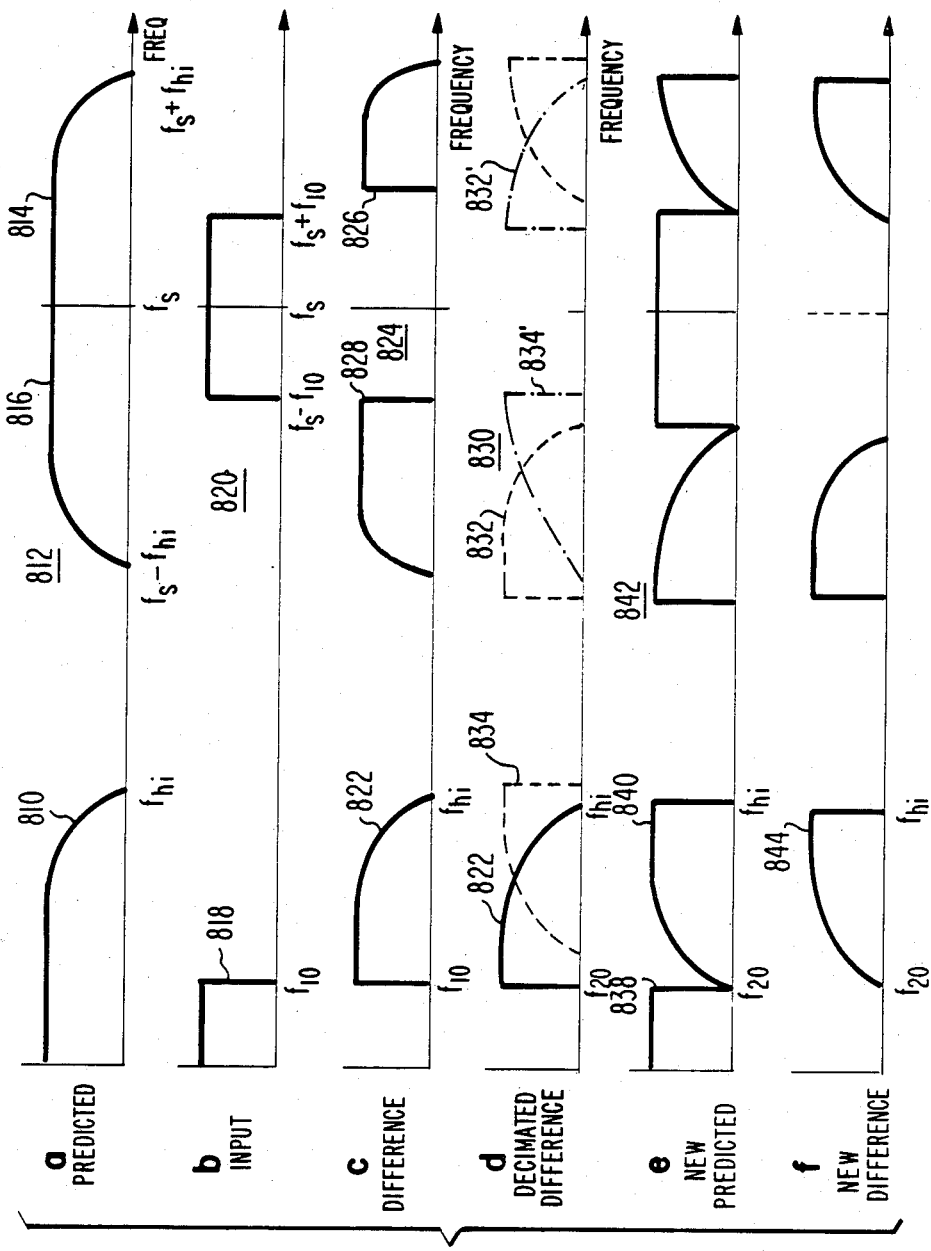
FIGS. 8a–8f, referred to jointly as FIG. 8 are amplitude-frequency spectra representing the frequency distribution of signals at various locations in the arrangement of FIG. 7.

While the arrangement of FIG. 7 operates to reduce the data rate and control the fill of rate buffer 28, there remains a minor problem, which is manifested as a ghost or distorted region which remains fixed in position at the location that a moving edge had at the moment of transition between a nondecimating mode and a decimating mode (or between a decimating mode and a further decimating mode), due to transient effects. This can be explained by noting that when fill control 210 of FIG. 7 causes the system to switch into a decimating mode after operation has continued for some time in a nondecimating mode, selectable low-pass filter 712 is switched into operation simultaneous with the beginning of decimation. As a consequence, the image-representative signal applied to the noninverting input terminal of subtractor 16 has a lower resolution than the signal applied to the inverting input terminal of subtractor 16 from predictor and delay circuit 24. Consequently, even though the data densities at the two inputs of subtractor 16 are identical, the high-frequency content of the image which is represented by the signals is not the same. As a result, difference signals are generated at the output of subtractor 16 which have nothing to do with the amount of decimation but rather are due to differences in the high frequency content. The problem is better explained by reference to FIG. 8.

In FIG. 8a, the main baseband portion of the full frequency spectrum of the predicted signal applied over conductor 25 includes a baseband portion 810 extending to a frequency $f_{hi}$. Another portion of the spectrum of the predicted signal on conductor 25 is sideband 812, including an upper portion 814 and a lower portion 816 centered about the sampling frequency $f_s$. Other baseband images centered about all other harmonics of $f_s$ (i.e. $2f_s$, $3f_s$... etc.) exist but are not illustrated in FIG. 8a. A moment after switching into a decimating mode, the input signal applied over conductor 15 to the noninverting input terminal of subtractor 16 has a band-limited spectrum such as that illustrated in idealized form in FIG. 8b. In FIG. 8b, baseband portion 818 extends to a frequency $f_{lo}$, rather than to $f_{hi}$, due to the action of filter 712. Sidebands 820 attributable to sampling do not extend as far about sampling frequency $f_s$ as do sidebands 812. The spectrum of the difference signal produced by subtractor 16 is illustrated in FIG. 8c. In FIG. 8c, high frequency baseband portions 822, which are the difference between baseband portions 810 and 818, are illustrated as extending from $f_{lo}$ to $f_{hi}$, and the corresponding sampling sidebands 824 include an upper frequency portion 826 and a lower frequency portion 828. The difference signals are applied through decimator 614 of FIG. 7, which effectively reduces the sample rate. The does not affect the baseband difference signal, as illustrated by 822 of FIG. 8d. However, the sampling sidebands 826, 828 illustrated in FIG. 8c are translated to a lower frequency, corresponding to a lower effective sampling frequency, and are represented as new sidebands 830, including an upper frequency portion illustrated in dashed lines as 832 and a lower frequency portion (also dashed) 834. As illustrated, lower frequency portion 834 of sampling sidebands 830 at least partially overlaps high frequency baseband portion 822. Other overlaps also occur, as illustrated in FIG. 8d by the overlap of a sideband 834' (illustrated by dotted lines) with sideband 832. Sideband 834' is the lower difference sideband resulting from the frequency translation of sidebands originally occurring about a frequency $2f_s$. Other similar overlaps also occur due to translation of other harmonics of $f_s$ to lower frequencies. The decimated difference signals (whose spectrum is illustrated in FIG. 8d) are applied in FIG. 7 from decimator 614 through interpolator 660 to an input of adder 22. Interpolator 660 does not change the frequency distribution from that illustrated in FIG. 8d, although it increases the sample rate. The predicted signal as applied to the second input terminal of adder 22 has the spectrum illustrated in FIG. 8a. The new predicted signal appearing on conductor 23 of FIG. 7 is the sum of signals having the spectra illustrated in FIGS. 8a and 8d, with appropriate polarity taken into account. High frequency baseband portion 822 of FIG. 8d is effectively subtracted from baseband portion 810 of FIG. 8a to leave a baseband portion 838 as illustrated in FIG. 8e, corresponding to baseband portion 818 of FIG. 8b. However, the baseband portion of the new predicted signal in FIG. 8e includes a high frequency portion 840, corresponding to portion 834 of FIG. 8d. The new predicted signal also includes high frequency portions designated generally as 842. After a frame interval, the new predicted signal (FIG. 8e) becomes a delayed predicted signal, and is subtracted from the low pass filtered input signal (FIG. 8b), to produce a new difference signal illustrated in FIG. 8f. The new difference signal includes a portion 844 for which no corresponding portion is found in the input signal. It can be seen that new difference signal 844 as illustrated in FIG. 8f is a frequency-inverted version (i.e. the upper and lower frequency positions of the spectrum are inverted) of the difference signal produced during the previous frame, which is illustrated as 822 of FIG. 8c. Consequently, it can been seen that the high frequency portion does not die away, but is continuously circulated, with a frequency inversion, through prediction and delay circuit 24, subtractor 16, decimator 614, interpolator 660 and adder 22. Its effect is the aforementioned ghosting of moving images. Moreover, the high frequency portions of the new difference signal (844) are applied to coder 26 and coded, thereby defeating the intent of the decimation. This problem is corrected by an arrangement as illustrated in FIG. 9.

Figure 9:
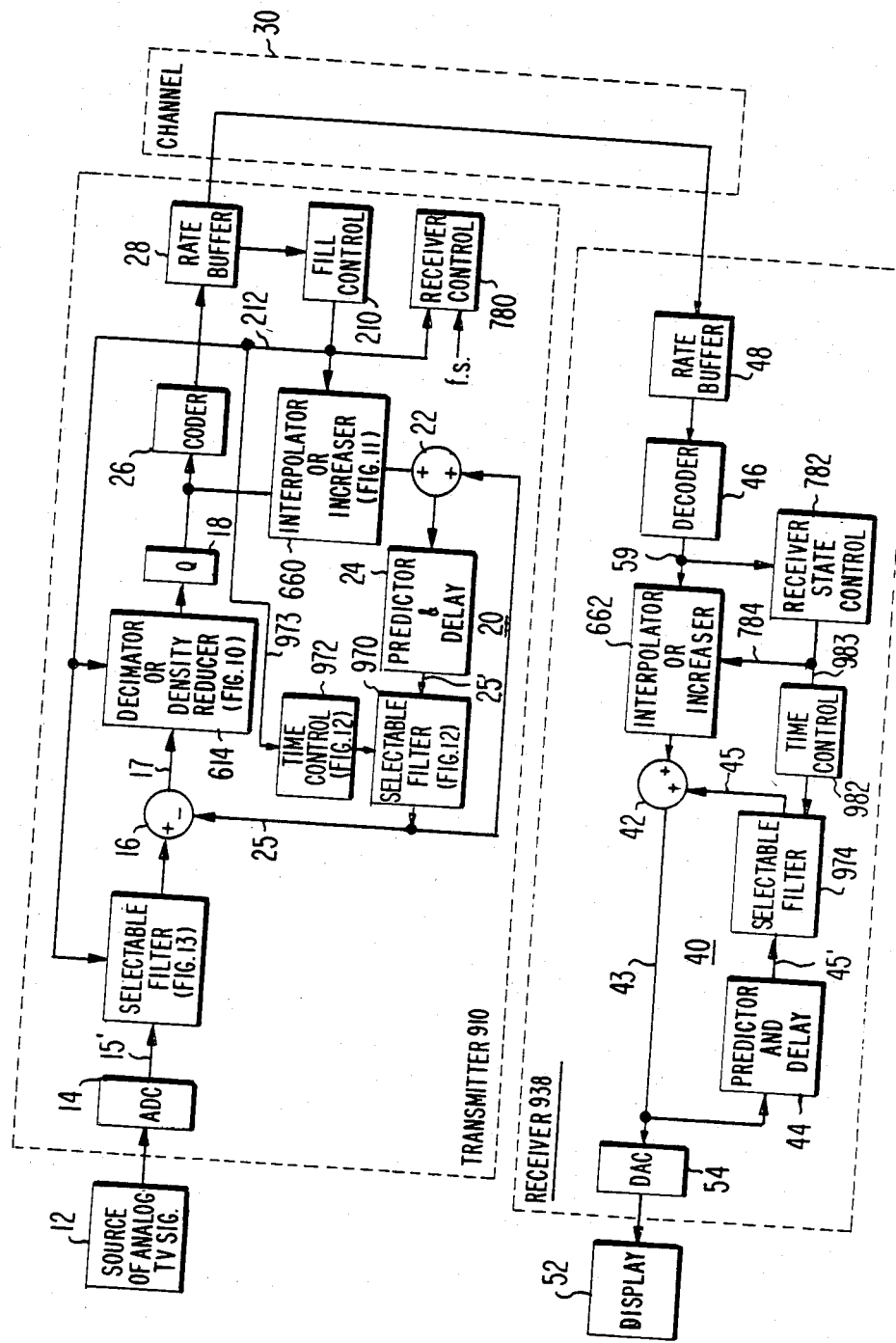
FIG. 9 is a block diagram similar to FIG. 7, further including filters according to another embodiment of the invention.

FIG. 9 is a block diagram of a further embodiment of the invention. FIG. 9 is similar to FIG. 7, and elements of FIG. 9 corresponding to those of FIG. 7 are designated by the same reference numeral. FIG. 9 differs from FIG. 7 in that transmitter 910 includes a further selectable filter 970 coupled by a conductor 25' between the output of predictor and delay circuit 24 and conductor 25. Selectable filter 970 is also coupled by a time control circuit illustrated as a block 972 and by a conductor 973 to conductor 212 for receiving the fill control signal from fill control circuit 210. As mentioned, the fill control signal represents the amount of fill of rate buffer 28. Receiver 938 includes a corresponding selectable filter 974 connected by a conductor 45' between the output of predictor and delay circuit 44 and conductor 45. Filter 974 is identical to filter 970. Filter 974 is controlled by a time control circuit illustrated as a block 982 connected by a conductor 983 to conductor 784 for being controlled by the receiver state control.

The purpose of selectable filters 970 and 974 is to correct for the differences in the high frequency content of the signals applied to subtractor 16, adder 22 and adder 42 due to transient effects during transitions between nondecimating and decimating modes, or between one decimating mode and another. In operation, selectable filter 970 is switched into operation simultaneously with selectable filter 712, decimator 614 and interpolator 660. Filter 974 and increaser 662 are switched in concurrently (i.e. at the appropriate received frame time). Filters 970 and 974 are low pass filters selected to attenuate signals passing therethrough which are above a certain frequency. Filters 970 and 974 attenuate high frequency baseband components such as component 822 of FIG. 8c and component 844 of FIG. 8f. If selectable low pass filters 970 and 974 were perfect filters, unwanted components 822 and 844, would be removed after exactly one frame interval, and the filters would thereafter no longer be required to be in-circuit. However, practical filters have limited attenuation characteristics, especially close to their cutoff frequencies. Consequently, high frequency baseband portions such as 822 and 844 of FIGS. 8c and 8f continue to circulate, although attenuated, for several frame intervals. However, the effect of filters 970 and 974 is to essentially eliminate the aforementioned ghosting associated with moving edges.

It has been found that if selectable filters 970 and 974 are left in-circuit at all times, the resolution quality of the picture reproduced by receiver 938 is degraded. It appears that this is due to a compounding of the effects of filter 970 with filter 712, so that the net filtering of the signal passing through the system is twice what would have been expected. This problem is corrected by leaving selectable filters 970 and 974 in-circuit for a limited number of frame intervals following a change in the decimation. The number of frame intervals during which filters 970 and 974 should be active depends upon their attenuation. For a readily implemented seven-section FIR filter, it has been found that an active or in-circuit period of three frame intervals following a change in decimation is suitable, simultaneously providing substantial elimination of moving ghosts together with a high quality image. Control of the energizing of selectable filters 970 and 974 is represented in FIG. 9 by time control circuits 972 and 982, respectively. Time control is described in more detail below.

Figure 10:
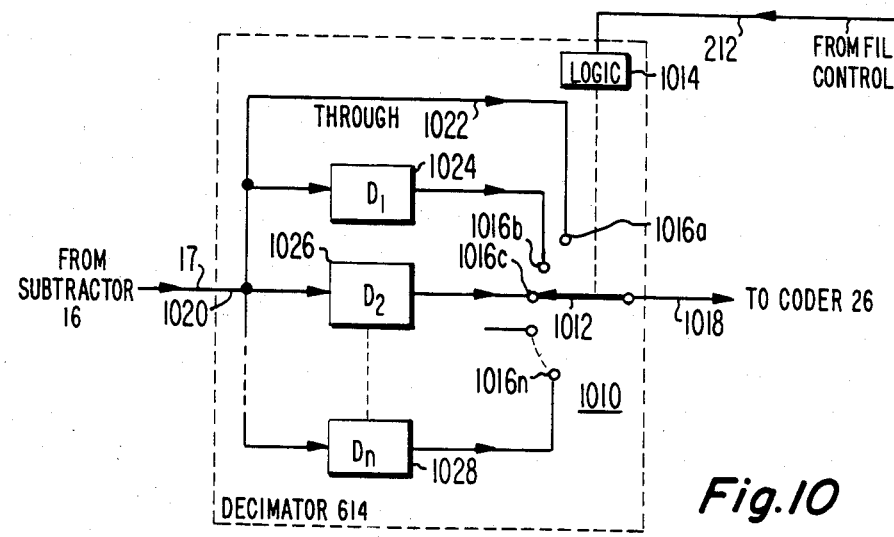
FIG. 10 is a simplified block diagram of a reducer or decimator useful in the arrangements of FIGS. 6, 7, and 9.

FIG. 10 is a simplified block diagram of decimator or data reducer 614 illustrated in FIGS. 6, 7 and 9. In FIG. 10, decimator 614 includes a multiplex switch which is actually implemented in the form of an array of independent solid-state gates but which is illustrated as a mechanical switch designated generally as 1010. Hereinafter, all multiplex switches are illustrated as mechanical equivalents, whatever their actual form. Multiplex switch 1010 includes a controllable wiper 1012, the position of which is controlled by a logic circuit 1014. Wiper 1012 can be set by logic circuit 1014 to couple any one of a plurality of terminals 1016a, 1016b, 1016c . . . 1016n to an output conductor 1018 which is adapted to be coupled to quantizer 18. An input conductor 1020 is adapted to receive difference signals from subtractor 16. Conductor 1020 is coupled to each of terminals 1016 by a separate path. The path between conductor 1020 and switch terminal 1016a is by way of a through path designated 1022, which is a nondecimating path. A second path extends between conductor 1020 and switch terminal 1016b by way of a first fixed decimator 1024, which is designated D1 to represent one value of decimation. A path between input conductor 1020 and switch terminal 1016c is by way of a second fixed decimator 1026, labeled D2 to indicate that it has a different decimation or sample rate conversion than decimator 1024. In a similar manner, various other paths between conductor 1020 and switch terminals 1016 are provided, including a further decimator 1028 denominated $D_n$ which is connected to switch terminal 1016n. In operation, logic circuit 1014 receives fill control signals over conductor 212. The fill control signals may be digital signals representing by a digital number one of a plurality N of "bins" or quantized levels in which the amount of lading of rate buffer 28 currently resides. For such digital fill control signals, logic circuit 1014 performs a one-of-N conversion or decoding in order to control the position of wiper 1012, which selects the appropriate through path or decimator for the fill condition indicated by the fill control signal. A simple control scheme might choose through path 1022 so long as the fill control signal indicates that rate buffer 28 is less than half full, a 5:4 decimation when the rate buffer is ¾ full, 4:3 at ⅞ full, and 2:1 at 15/16 full. It should be noted that the decoding function of logic circuit 1014 could be performed in fill control circuit 210, in which case the signals applied by conductor 212 to decimator 614 would already be decoded, and logic circuit 1014 could be dispensed with.

Figure 11:
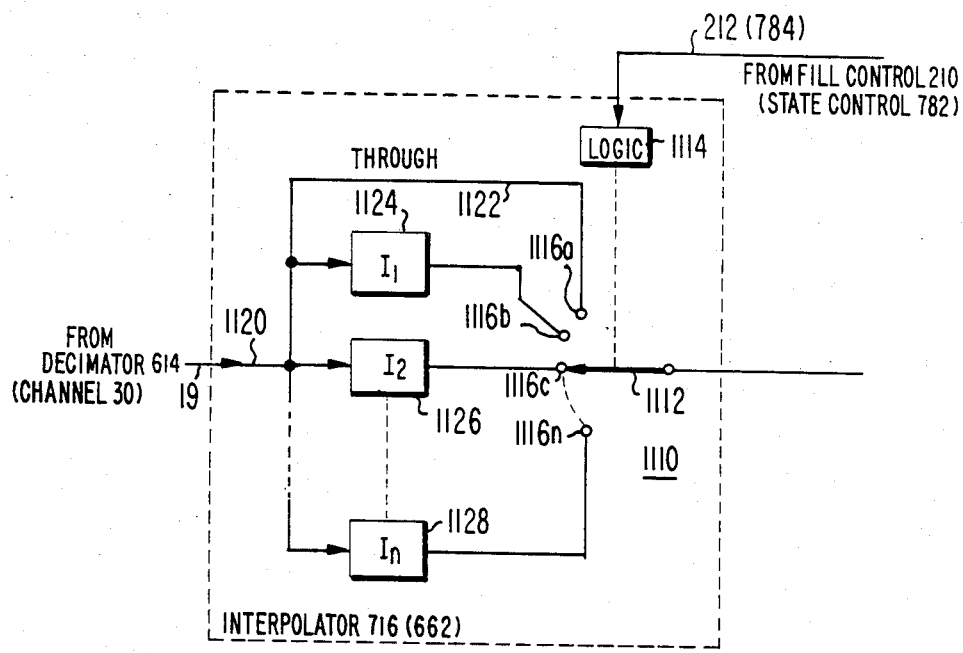
FIG. 11 is a simplified block diagram of a selectable interpolator or data rate increaser useful in the arrangements of FIGS. 6, 7, and 9.

FIG. 11 is a simplified block diagram of interpolators 660 or 662 of FIGS. 6, 7 and 9. The structure of interpolators 660 or 662 as illustrated in FIG. 11 is very similar to the structure of decimator or density reducer 614 as illustrated in of FIG. 10. This is not surprising, considering that a corresponding function is desired. In FIG. 11, a multiplex switch designated as 1110 includes a moving wiper or contact 1112, the position of which is controlled by a logic circuit 1114 which is coupled to receive fill control signals over conductor 212 (or conductor 784, in the case of interpolator 662). Logic circuit 1114 performs one-of-N conversion or decoding (if appropriate) in response to the fill condition and sets wiper 1112 in contact with one of switch terminals 1116a, 1116b., 1116c . . . 1116n. An input conductor 1120 is common to a number of paths, each of which terminates at a switch terminal 1116. A first path is a through path designated 1122 which terminates at switch terminal 1116a. A first fixed interpolator or density increaser ($I_1$) designated 1124 is coupled between conductor 1120 and switch terminal 1116b. Similarly, a further plurality of interpolators having different interpolation functions is designated 1126 . . . 1128 and is coupled to switch terminals 1116c . . . 1116n. Each of interpolators 1126 . . . 1128 has an interpolation function $I_1 \ldots I_n$ which is the inverse of the decimation functions $D_1 \ldots D_n$ of decimators 1024–1028. Logic circuits 1014 and 1114 are similarly structured so as to select corresponding decimation and interpolation functions for the same control signal conditions, or for the corresponding control signal from receiver state control 782, in the case of interpolator 662.

Figure 12:
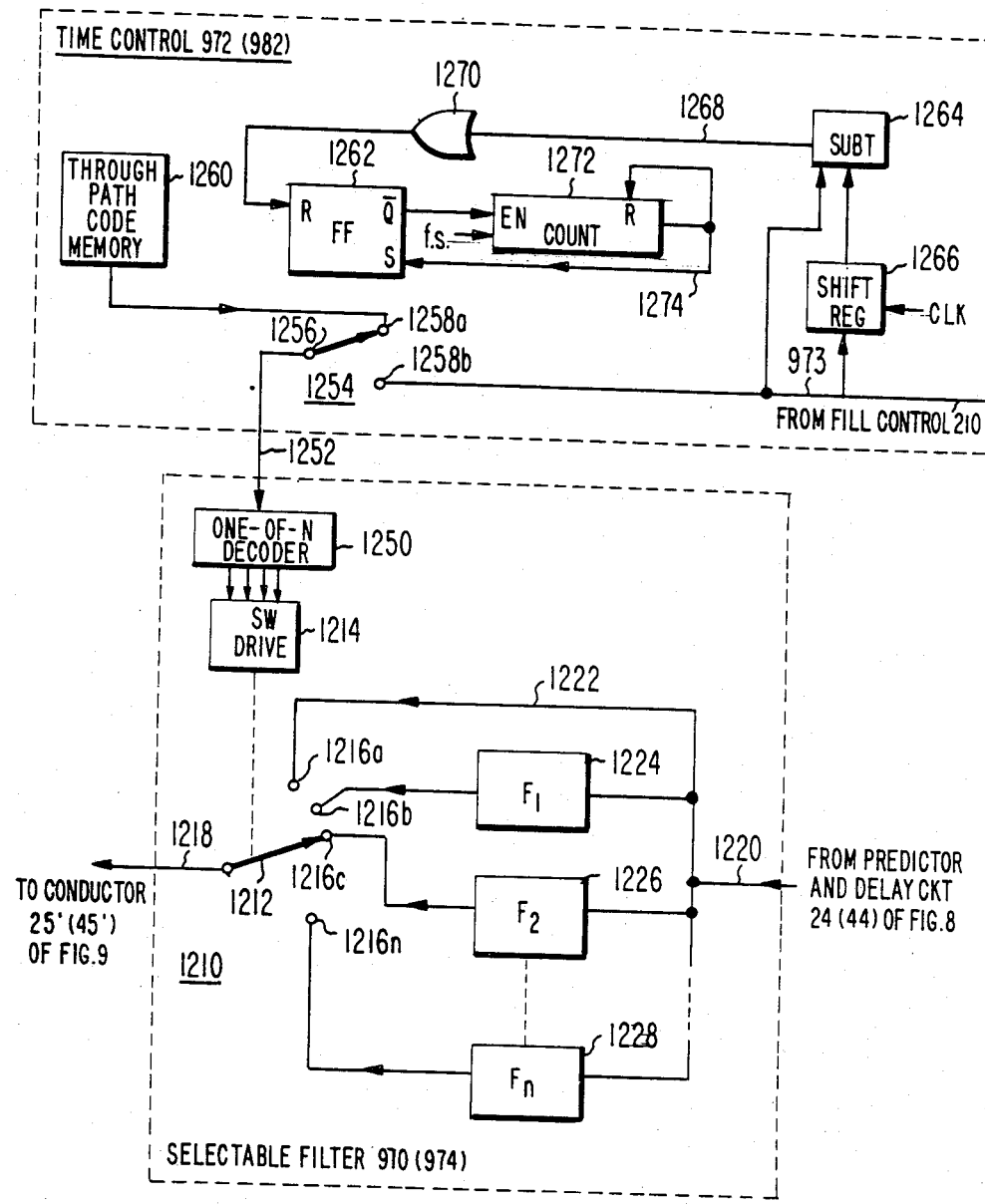
FIG. 12 is a simplified block diagram of a selectable filter useful in the arrangement of FIG. 9.

FIG. 12 is a simplified block diagram of selectable filters 970 of FIG. 9, together with time control 972. These are identical to filter 974 and time control 928 of FIG. 9. In FIG. 12, selectable filter 970 includes a multiplex switch designated generally as 1210 with a movable wiper 1212 controllable by a switch drive circuit 1214 which is adapted to connect movable wiper 1212 to one of a plurality of terminals 1216a, 1216b, 1216c . . . 1216n. Movable wiper 1212 is continuously connected to a conductor 1218 which is adapted to be connected to conductor 25' or 45' of FIG. 9 for receiving delayed predicted signal. A common output conductor 1220 is connected to each of terminals 1216a . . . 1216n by a separate path. A through path between conductor 1220 and terminal 1216a is designated 1222. A first fixed low-pass filter 1224 having filter function $F_1$ is connected between common conductor 1220 and a second switch terminal 1216b. Similarly, a plurality of further fixed filters 1226 . . . 1228 with filter functions $F_2 \ldots F_n$ is connected between conductor 1220 and terminals 1216c . . . 1216n. Each of filters $F_1 \ldots F_n$ has a filtering characteristic selected in conjunction with the corresponding filtering characteristic of selectable filter 712 so as to substantially eliminate the above-mentioned ghosting. A one-of-N decoder 1250 decodes the control signal applied thereto over a conductor 1252 from a multiplex switch 1254, which is part of time control 972. Multiplex switch 1254 includes a wiper 1256 coupled to conductor 1252, and also includes terminals 1258a and 1258b connected to a through path code memory 1260 and to a conductor 973, respectively. Terminal 1258b receives fill control signal from fill control unit 210. The position of wiper 1256 of multiplex switch 1254 is controlled by a flip-flop (FF) 1262. FF 1262 is normally in a set condition, which holds movable wiper 1256 in contact with terminal 1258a, for coupling a through path code from a memory 1260 to one-of-N decoder 1250. One-of-N decoder 1250 responds to the through path code to set wiper 1212 of multiplex switch 1210 in contact with conductor 1216a, thereby setting selectable filter 970 into the through path state. Thus, the normal condition of selectable filter 970 is the through condition. Fill control circuit 210 can be configured to issue one of N numbers which denote which of N (uniformly or non-uniformly spaced) portions of the rate buffer the current fill resides. Therefore, the fill control signal can take on any one of N values depicting the fill level. Since one of the N numbers issued by fill control 210 is the through path code, decoder 1250 needs to decode only N (not N+1) numbers. This fill control signal applied from fill control circuit 210 on conductor 973 is applied directly to an input terminal of a subtractor 1264 and through a shift register 1266 to a second input of subtractor 1264. Shift register 1266 delays the control signal applied to the second input terminal of subtractor 1266 from conductor 973 for one clock cycle. So long as the control signal on conductor 973 remains unchanged from clock cycle to clock cycle, the same signal is applied to both input terminals of subtractor 1264, and subtractor 1264 produces zero magnitude signal on output conductor 1268. The clock cycle may be pixel to pixel, scan line to scan line, or frame to frame depending on the design criteria. Any time a change occurs in the control signal on conductor 973, differing signals are momentarily applied to the inputs of subtractor 1264, which responds with a nonzero value. The nonzero value at the output of the subtractor 1264 is applied by conductor 1268 to an OR gate 1270 for Oring together all the bits. The output of OR gate 1270 is applied to the reset (R) input terminals of FF 1262. FF 1262 responds with a transition which (a) throws wiper 1256 of switch 1254 into contact with terminal 1258b, and (b) generates a signal at its $\overline{Q}$ output which is applied to the enable (EN) input terminal of a counter 1272, which also receives frame sync (f.s.) signals at an input, whereby counter 1272 begins counting frame synchronization signals. Until such time as counter 1272 reaches full count, fill control signals are applied from conductor 973 to one-of-N decoder 1250, which responds by switching wiper 1212 of switch 1210 into contact with the appropriate one of terminals 1216b ... 1216n, for selecting one of filter characteristics $F_1$ ... $F_n$. When counter 1272 reaches the desired count, as for example the aforementioned count of three frame sync intervals, counter 1272 produces an output signal on a conductor 1274 which resets counter 1272, and which is also applied to the set (S) input terminal of FF 1262 to return it to the set condition. When FF 1262 returns to the set condition, wiper 1256 returns to contact with terminal 1258a, once again applying through path code to one-of-N decoder 1250, which operates wiper 1212 to contact terminal 1216a for selecting the through path. Thus, a transition in the control signal on conductor 937 resets FF 1262, allowing the control signal to be applied to one-of-N decoder 1250, which sets wiper 1212 to the appropriate filtering condition. After the desired frame intervals expires, FF 1262 is set, returning multiplex switch 1254 to a state in which it passes a through code memory to decoder 1250, which responds by setting multiplex switch 1210 to the through position.

Figure 13:
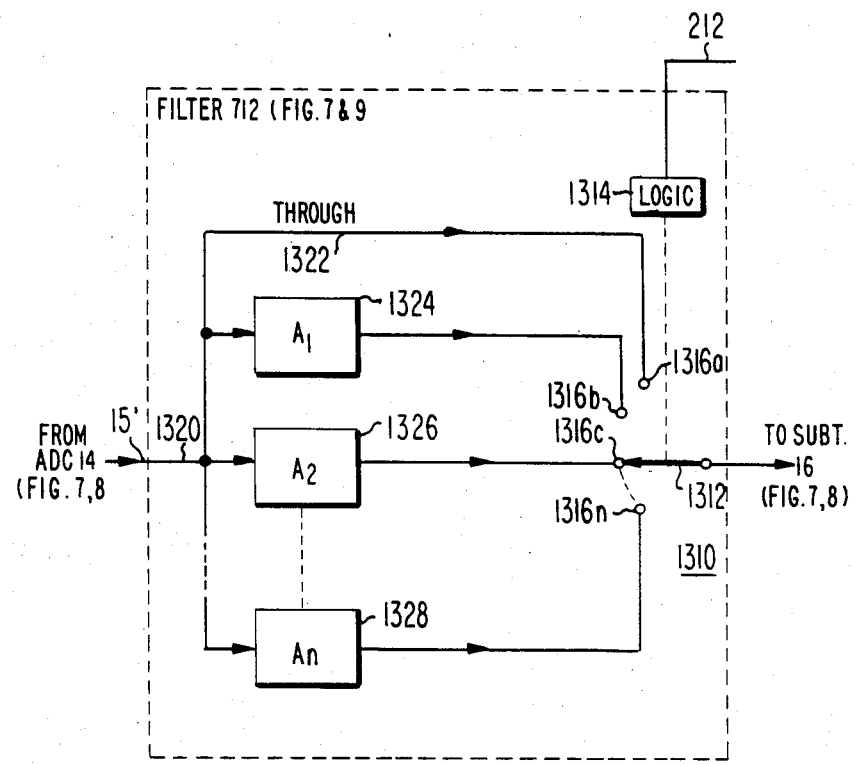
FIG. 13 is a simplified block diagram of a selectable low-pass filter useful in the arrangements of FIGS. 7 and 8.

FIG. 13 illustrates, in simplified block diagram form, a selectable filter such as filter 712 of FIGS. 7 and 9. The overall structure of filter 712 is identical to the overall structure of decimator 614 of FIG. 10 and interpolator 716 of FIG. 11. In view of the structural similarity, elements of FIG. 13 corresponding to elements of FIGS. 10 and 11 are designated by the same reference numerals, but in the 1300 series, rather than the 1000 series or 1100 series. In the arrangement of FIG. 13, a logic circuit 1314 controls wiper 1312 to select a through path 1322 or one of various low pass filters 1324, 1326 ... 1328 having various different low pass characteristics which are $A_1$-$A_n$, which are selected to provide suitable anti-aliasing filtering when used in conjunction with decimators $D_1$ ... $D_n$. A particularly good set of low pass characteristics $A_1$-$A_n$ are those which match the low pass characteristics $F_1$-$F_n$ of FIG. 12.

Figure 14:
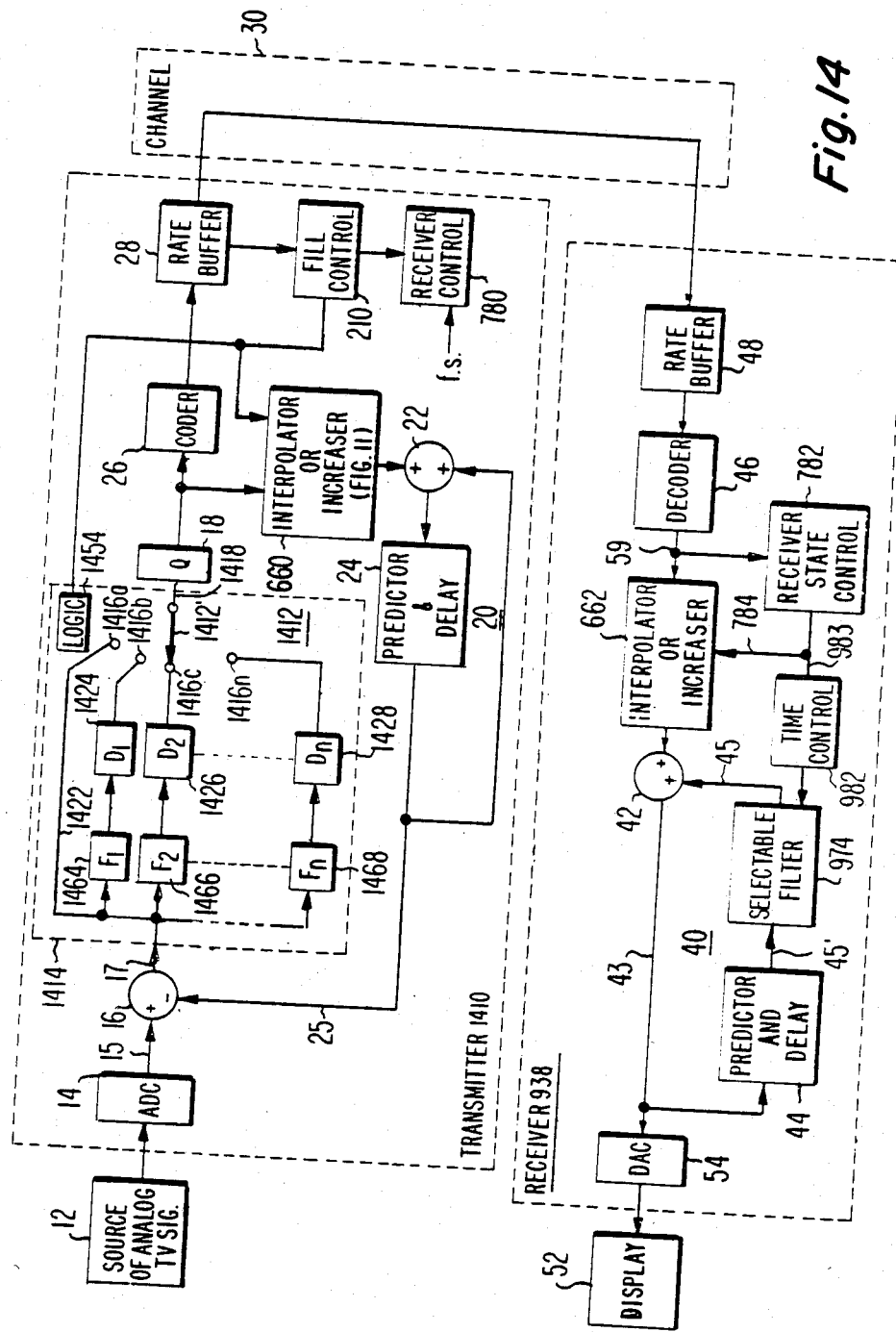
FIG. 14 is a simplified block diagram of another embodiment of the invention, in which filtering follows rather than precedes the subtractor.

FIG. 14 is a simplified block diagram of another embodiment of the invention. FIG. 14 is similar to FIG. 9, and elements of FIG. 14 corresponding to those of FIG. 9 are designated by the same reference numerals. Receiver 938 of FIG. 14 is identical to receiver 938 of FIG. 9. Transmitter 1410 of FIG. 14 differs from transmitter 910 of FIG. 9 in that selectable low pass filter 712 of transmitter 910 has been deleted, and corresponding selectable low pass filters are incorporated into decimator 1414 which replace decimator 614. This has the advantage that fewer control circuits are required to accomplish the switching of decimation modes and of the ancillary filtering. In FIG. 14, decimator 1414 includes a multiplex switch designated generally as 1412. Multiplex switch 1412 includes a movable wiper 1412', the position of which is controlled by a logic circuit 1454 based upon fill control signals received over conductor 212. Movable wiper 1412' connects coarse quantizer 18 by way of a conductor 1418 to one of a plurality of terminals 1416a, 1416b, 1416c ... 1416n. Input conductor 17 to decimator 1414 is connected to each of terminals 1416a ... 1416n by a separate path. A first path, which lies between input conductor 17 and terminal 1416a, is a through path designated 1422. Another path lies between input conductor 17 and switch terminal 1416b, and includes a fixed low pass filter 1464 having filter function $F_1$ and a fixed decimator 1424 having a decimation characteristic $D_1$. Another path lies between input conductor 17 and switch terminal 1416c, and includes another low pass filter 1466 having filter characteristic $F_2$ and a decimator 1426 having decimation characteristic $D_2$. Similarly, other filters and decimators (not separately illustrated) may be included, the last of which is low pass filter 1468 having characteristic $F_n$ and decimator 1428 having characteristic $D_n$, which are connected to switch terminal 1416n. Decimator characteristics $D_l$, $D_2$ ... $D_n$ correspond to the characteristics of the same designation of decimator 614 of FIG. 10. Filter characteristics $F_1$, $F_2$ ... $F_n$ are selected in conjunction with their associated decimators for elimination of artifacts such as aliasing.

Other embodiments of the invention will be apparent to those skilled in the art. For example, many of the functions described may be performed by both analog or digital embodiments. The "bins" into which the lading of rate buffer 28 is quantized for purposes of feedback control may be of equal sizes, or they may be unequal in size. Filters described as using multiplex switches to switch among a plurality of fixed characteristic filters may instead be single filters with selectable weighting functions. Similarly, decimators and interpolators, described as using multiplex switches to switch among a plurality of fixed charactertistic decimator and inpolators may instead be single units which can be internally re-configured by logic to perform the desired decimation and interpolation. While the communication system has been described as having one receiver and one transmitter, it should be clear that multiple receivers may be used for each transmitter. Also, channel 30 may include modulators and demodulators for transmitting the signals by modulated light over fiber-optic cables, by terrestrial satellite transmissions, over coaxial cable etc. The data may be encoded with cyclic redundancy codes or other codes for error detection or correction. In the arrangement of FIG. 9, it is not essential that filters 970 and 974 be switched into operation when the mode is changed from a decimating mode to a nondecimating mode or to a mode of lesser decimation; thus when the rate buffer is well emptied, the amount of decimation may be reduced and the bandwidth of filter 712 may be increased while leaving filters 970 and 974 in the "through" mode.

While coarse quantizer 18 has been described as producing a coarsely quantized signal which is applied both to adder 22 and to coder 26, it may produce two different but related output signals for separate application to the adder and coder.

What is claimed is:

1. A method for differential pulse code modulation of sampled frame sequential signals, comprising the steps of:
    subtracting delayed predicted signals from the frame sequential signals to produce difference signals;
    controllably decimating said difference signals to produce decimated difference signals;
    interpolating said decimated difference signals to produce an interpolated sample for each decimated sample to form a stream of restored data rate difference signals including at least some interpolated signals;
    adding said delayed predicted signals to said restored data rate difference signals to produce current predicted signals; and
    at least delaying said current predicted signals to produce said delayed predicted signals.

2. A method according to claim 1 wherein said frame sequential signals comprise television signals representing an image, and wherein said at least delaying step includes the step of delaying said current predicted signal by one frame interval.

3. A method according to claim 2 further comprising the steps of:
    coding said decimated difference signals to produce coded signals in a manner which results, as a function of said image which said television signals represent, in changes from time to time in the rate of data flow of said coded signals;
    storing said coded signals in a buffer as they are generated to form buffered coded signals;
    transmitting said buffered coded signals at a constant rate, whereby said buffer may from time to time tend to approach an extreme of lading;
    generating a control signal representing the need to increase or decrease the flow of said coded signals to said buffer to prevent said extreme of lading; and
    controlling, by the use of said control signal, said step of controllably decimating said samples of said television signals, thereby controlling said flow of said coded signals to said buffer in a manner tending to maintain the lading of said buffer between maximum and minimum extremes.

4. A method according to claim 2 further comprising the step of filtering said television signals before said subtracting step to reduce the resolution of the image represented by said television signals.

5. A method according to claim 4 further comprising the step of filtering one of said difference signals and said predicted signals to correspondingly reduce the resolution of said predicted signals.

6. A method according to claim 3 further comprising the step of filtering said television signals before said subtracting step to reduce the resolution of the image represented by said television signals.

7. A method according to claim 6 further comprising the step of filtering one of said difference signals and said predicted signals to correspondingly reduce the resolution of said predicted signals.

8. A method according to claim 7 further comprising the step of controlling said filtering of said television signals in response to said control signal for reducing the visibility of artifacts resulting from said decimation.

9. A method according to claim 8 further comprising the steps of controlling said filtering of one of said difference signals and said predicted signals in response to said control signal for reducing the visibility of artifacts resulting from said filtering of said television signals.

10. A method according to claim 9 wherein said step of controlling said filtering of one of said difference signals and said predicted signals comprises the further step of disabling said filtering beginning at a predetermined time following the initiation of said step of filtering of said television signal.

11. A differential pulse code modulation apparatus for differential pulse code modulation of frame-sequential signals, comprising:
    a subtractor for subtracting delayed predicted signals from currently arriving frame-sequential signals to produce difference signals;
    an adder including first and second input terminals, said second input terminal of said adder being adapted for receiving said delayed predicted signals for adding said delayed predicted signals to data rate restored difference signals applied to said first input terminal of said adder for producing current predicted signals;
    signal prediction means coupled to said subtractor and also coupled to said adder for receiving said current predicted signals and for processing said current predicted signals to produce said delayed predicted signals;
    first signal coupling means coupled to said subtractor and to said first input terminal of said adder for coupling signals therebetween, said signal coupling means comprising decimating means coupled for decimating said difference signals for reducing the number of samples per unit time of said difference signals for producing sample rate reduced difference signals, said signal coupling means further comprising interpolating means coupled to said decimating means for receiving said sample rate reduced difference signals and for interpolating said sample rate reduced difference signals to restore said sample rate for generating said data rate restored difference signals and for applying said data rate restored difference signals to said first input terminal of said adder, said data rate restored difference signals including at least some interpolated signals.

12. Apparatus according to claim 11, wherein said signal prediction means comprises at least frame delay means.

13. Apparatus according to claim 11 further comprising:
coding means coupled to said signal coupling means for producing coded signals from said sample rate reduced difference signals, which coded signals, as a result of changes from time to time in the information which said sample rate reduced difference signals represent, have a variable data rate;
rate buffer means coupled to said coding means for accepting said coded signals at said variable data rate for temporarily storing said coded signals and for transmitting said coded signals at a constant rate, said rate buffer means having a maximum capacity, whereby said variable data rate may tend to result in a lading of said rate buffer means at an extreme of said capacity of said rate buffer means;
control signal generating means coupled to said rate buffer means for generating a control signal in response to the lading condition of said rate buffer means; and
second coupling means coupled to said control signal generating means and to said first signal coupling means for controlling said decimating means in response to said control signal in such a manner as to tend to maintain a nominal fill of said rate buffer means.

14. Apparatus according to claim 13 wherein said frame sequential signal comprises a television signal, and further comprising first filtering means coupled to said subtractor for filtering said currently arriving television signals for reducing the resolution of the image represented by said television signals.

15. Apparatus according to claim 14 comprising:
further filtering means coupled to one of said first signal coupling means and said signal prediction means for filtering one of said difference signals and said predicted signals, respectively.

16. Apparatus according to claim 15 further comprising:
third coupling means coupled to said control signal generating means and to said first filtering means for controllably filtering said currently arriving television signals in response to said control signal for reducing the visibility of artifacts resulting from said decimation.

17. Apparatus according to claim 16 further comprising:
fourth coupling means coupled to said control signal generating means and to said further filtering means for controllably filtering said one of said difference signals and said predicted signals in response to said control signal for reducing the visibility of artifacts resulting from said decimation.

18. Apparatus according to claim 17 wherein said fourth coupling means further comprises timing means for changing the filtering condition of said further filtering means at predetermined time after a previous change.

19. Apparatus according to claim 11 wherein said frame sequential signal comprises television signals, and further comprising first filtering means coupled to said subtractor for filtering said currently arriving frame-sequential signals for reducing the resolution of the image represented by said television signals.

20. Apparatus according to claim 19 further comprising filtering means coupled to one of said first signal coupling means and said signal prediction means for filtering one of said difference signals and said predicted signals, respectively.

21. A frame sequential signal communication system including at least one data transmitter and one data receiver and a signal channel extending therebetween, said transmitter comprising:
a subtractor for subtracting delayed predicted signals from currently arriving frame-sequential signals to produce difference signals;
a first adder including first and second input terminals, said second input terminal of said first adder being adapted for receiving said delayed predicted signal for adding said delayed predicted signals to restored data rate difference signals applied to said first input terminal of said first adder for producing current predicted signals;
first signal prediction means coupled to said subtractor and also coupled to said first adder for receiving said current predicted signals and for processing said current predicted signals to produce said delayed predicted signals;
first signal coupling means coupled to said subtractor and to said first input terminal of said first adder for coupling signals therebetween, said first signal coupling means comprising decimating means coupled for decimating said difference signals for reducing the number of samples per unit time of said difference signals for producing sample rate reduced difference signals, said first signal coupling means further comprising first interpolating means coupled to said decimating means for receiving said sample rate reduced difference signals and for interpolating said sample rate reduced difference signals to restore said sample rate for generating said restored data rate difference signals and for applying said restored data rate difference signals to said first input terminal of said first adder, said restored data rate difference signals including at least some interpolated signal;
second signal coupling means coupled to said decimating means and to a transmitting end of said data channel for applying said sample rate reduced difference signals to said data channel; and said receiver comprising:
second interpolating means coupled to a receiving end of said data channel for receiving said sample rate reduced difference signals, said second interpolating means being identical to said first interpolating means for restoring said sample rate and for generating reproduced restored data rate difference signals;
a second adder including first and second input terminals, said first input terminal of said second adder being coupled to said second interpolating means for receiving said reproduced restored data rate difference signals for adding said reproduced restored data rate difference signals to reproduced delayed predicted signal applied to said second input terminal of said second adder for generating reproduced current prediction signals; and second signal prediction means identical to said first signal prediction means, said second signal prediction means being coupled to said second adder for receiving said reproduced current prediction signals therefrom and for processing said reproduced current prediction signals to produce said reproduced delayed prediction signals.

22. A system according to claim 21 wherein said frame sequential signal comprises a television signal, and wherein said first and second signal prediction means each comprise means for delaying signal applied thereto by one television frame interval.

* * * * *